(12) United States Patent
Stove et al.

(10) Patent No.: US 11,604,302 B2
(45) Date of Patent: Mar. 14, 2023

(54) METHOD FOR DETERMINING MATERIAL AND/OR SUBSURFACE TEMPERATURES

(71) Applicant: Adrok Limited, Edinburgh (GB)

(72) Inventors: George Colin Stove, Edinburgh (GB); Gordon D. C. Stove, Edinburgh (GB); Michael J. Robinson, Edinburgh (GB)

(73) Assignee: Adrok Limited, Edinburgh (GB)

( * ) Notice: Subject to any disclaimer, the term of this patent is extended or adjusted under 35 U.S.C. 154(b) by 186 days.

(21) Appl. No.: 16/094,769

(22) PCT Filed: Apr. 20, 2017

(86) PCT No.: PCT/GB2017/051100
§ 371 (c)(1),
(2) Date: Oct. 18, 2018

(87) PCT Pub. No.: WO2017/198996
PCT Pub. Date: Nov. 23, 2017

(65) Prior Publication Data
US 2019/0120992 A1 Apr. 25, 2019

(30) Foreign Application Priority Data
May 18, 2016 (GB) .................... 1608765

(51) Int. Cl.
G01K 11/00 (2006.01)
G01V 3/12 (2006.01)
G01S 13/88 (2006.01)

(52) U.S. Cl.
CPC ............... G01V 3/12 (2013.01); G01K 11/00 (2013.01); G01S 13/885 (2013.01)

(58) Field of Classification Search
CPC .... G01K 13/02; G01K 2213/00; G01K 13/00; G01K 7/343; G01K 11/00; G01V 3/12; G01S 13/885
(Continued)

(56) References Cited

U.S. PATENT DOCUMENTS 4,123,160 A 10/1978 Caputo et al.
4,798,209 A 1/1989 Klingenbeck et al.
(Continued)

FOREIGN PATENT DOCUMENTS

CN 105425215 A 3/2016
GB 2908195 A * 9/1979
(Continued)

OTHER PUBLICATIONS

Lameloise, C., "International Search Report," prepared for PCT/GB2017/051100, dated Jul. 3, 2017, four pages.
(Continued)

Primary Examiner — Gail Kaplan Verbitsky
(74) Attorney, Agent, or Firm — Lando & Anastasi, LLP

(57) ABSTRACT

Disclosed is a method of determining subsurface temperatures of a surveyed region. The method comprises using a transmitter to transmit a pulsed electromagnetic signal into the ground; using a receiver to detect a return signal following interaction of said transmitted signal with features of the subsurface and determining one or more temperatures within the subsurface from the return signal. The temperature may be determined from a dielectric constant of a subsurface region, as determined from the received signal.

11 Claims, 6 Drawing Sheets

(58) Field of Classification Search
USPC ...... 374/136, 135, 120, 124, 130; 702/6, 11; 248/550, 552; 340/870.17
See application file for complete search history.

(56) References Cited

U.S. PATENT DOCUMENTS

| | | | | |
|---|---|---|---|---|
| 5,346,307 | A * | 9/1994 | Ramirez et al. | G01K 13/00 324/715 |
| 6,755,246 | B2 * | 6/2004 | Chen | G01V 3/32 166/250.01 |
| 8,016,038 | B2 * | 9/2011 | Goodwin | E21B 49/10 166/264 |
| 8,164,339 | B2 * | 4/2012 | Fang | E21B 47/01 324/356 |
| 8,485,722 | B1 * | 7/2013 | Roeder | G01K 11/006 374/122 |
| 8,560,268 | B2 * | 10/2013 | Smithson | F04B 49/02 702/166 |
| 8,661,888 | B2 * | 3/2014 | Popov | G01V 3/26 73/152.13 |
| 8,704,677 | B2 * | 4/2014 | Prammer | E21B 47/00 340/853.7 |
| 10,704,378 | B2 * | 7/2020 | Rogacheva | E21B 47/047 |
| 2006/0065394 | A1 * | 3/2006 | Clark | G01V 3/30 166/254.2 |
| 2006/0170424 | A1 | 8/2006 | Kasevich | |
| 2008/0285619 | A1 * | 11/2008 | Thompson | G01K 13/00 374/136 |
| 2009/0139768 | A1 * | 6/2009 | Castillo | E21B 25/10 175/50 |
| 2009/0200016 | A1 * | 8/2009 | Goodwin | E21B 49/10 166/248 |
| 2009/0301781 | A1 * | 12/2009 | Fang | G01V 3/30 175/50 |
| 2012/0057614 | A1 * | 3/2012 | Normann | G01K 3/14 374/112 |
| 2013/0266039 | A1 * | 10/2013 | Legrand | E21B 47/10 374/136 |
| 2013/0328693 | A1 * | 12/2013 | Mohamadi | E21B 47/13 340/854.6 |
| 2015/0096942 | A1 * | 4/2015 | Wang | G01K 1/026 210/742 |
| 2015/0153470 | A1 * | 6/2015 | Stove | G01S 7/411 702/6 |
| 2016/0011413 | A1 * | 1/2016 | Hannweber | B23K 1/0056 359/225.1 |
| 2016/0168977 | A1 * | 6/2016 | Donderici | E21B 43/2408 175/45 |
| 2018/0030824 | A1 * | 2/2018 | Roberson | E21B 47/13 |
| 2018/0223647 | A1 * | 8/2018 | Johnston | E21B 47/07 |
| 2019/0017538 | A1 * | 1/2019 | Gurvich | B29C 66/721 |

FOREIGN PATENT DOCUMENTS

| | | |
|---|---|---|
| SU | 1508180 A1 | 9/1989 |
| WO | WO-0118533 A1 | 3/2001 |
| WO | WO-2006016824 A1 | 2/2006 |
| WO | WO-20130186559 A2 | 12/2013 |

OTHER PUBLICATIONS

Robinson, Michael, "Unearthing a Better Way," Engineering Designer—The Journal of the Institution of Engineering Designers, Sep. 1, 2014, 32 pages.

Katzir, Andrew, "Lasers and Optical Fibers in Medicine," in Lasers and Optical Fibers in Medicine, Dec. 2, 2012, Elsevier, pp. 74-76.

* cited by examiner

METHOD FOR DETERMINING MATERIAL AND/OR SUBSURFACE TEMPERATURES

This invention relates to methods, apparatus, and computer code for determining temperatures of material, and in particular determining temperatures within the subsurface.

In order to enhance hydrocarbon recovery from a subsurface deposit, enhanced recovery methods employing steam (or other hot fluid) injection may be used, where steam is injected into the subsurface to aid recovery of the hydrocarbons. It is desirable, but not always simple, to determine where this steam flows subsequent to injection. One way of determining the flow of steam is by obtaining temperature measurement of the subsurface. Regions (e.g., layers) of elevated temperature may indicate the presence of injected steam.

Another possible application for determining subsurface temperatures is to locate sources of heat for geothermal applications.

Presently, temperature is measured by drilling subsurface and inserting thermometers. For some enhanced recovery hydrocarbon techniques, such measurements need to be made regularly, yet are costly to perform.

It would be desirable to provide a simpler and cheaper method of measuring temperature, and in particular subsurface temperature.

In a first aspect of the invention there is provided a method of determining subsurface temperatures of a surveyed region comprising the steps of:
using a transmitter to transmit a pulsed electromagnetic signal into the ground;
using a receiver to detect a return signal following interaction of said transmitted signal with features of the subsurface;
determining one or more temperatures within the subsurface from the return signal.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
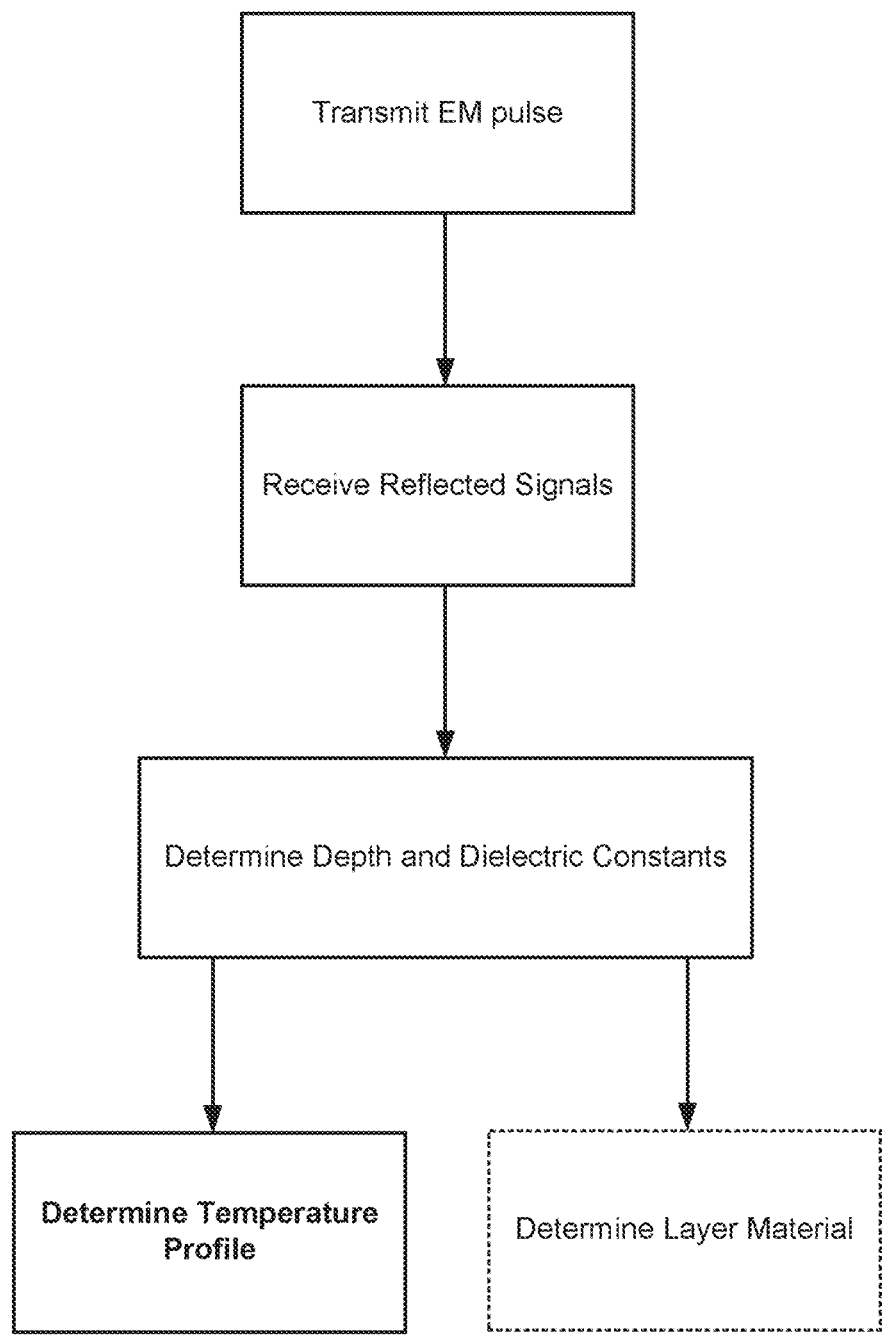
FIG. 1 is a high-level flow diagram of a method according to an embodiment of the present invention.

Glossary of Terms Used in the Description

E-ADR
  Energy-ADR—the resonant energy measurement of a subsurface layer of measured thickness FFT Analysis
  Fast Fourier Transform Analysis is a technique for spectral analysis of signals. The analysis of the returned ADR signals from the subsurface to the ADR receiving system is performed by FFT analysis of the received spectrum (which includes radio waves and microwaves). This results in mathematical and statistical analysis of the received spectrum and the recognition of energy, frequency and phase relationships. More detailed spectrometric analysis is achieved through the quantum electrodynamic (QED) approach (Feynman, 1985) by quantising the entire ADR receive spectrum. In ADR quantum theory, this is similar to the equal temperament system of tuning musical instruments—in which each pair of adjacent musical notes has an identical frequency ratio. In this "tuning" methodology, an interval (usually an octave) is divided into a series of equal steps, with equal frequency ratios between successive notes. For example, a violin is tuned in perfect fifths. The notes are G-D-A-E; where the fundamental G is 192 Hertz, D is 288 Hertz, A is 432 Hertz and E is 648 Hertz. Note that a perfect fifth is in a 3:2 relationship with its base tone. The octave frequency interval is covered in seven steps (A, B, C, D, E, F and G) and each tone is the ratio of the $7^{th}$ root of ½, or in mathematical form [(½) $^{(1/7)}$]. For ADR, the quantised frequency spectrum includes 3 octaves of the radiowave spectrum and 33 octaves of the microwave spectrum. When ADR is applied to geological analysis, rocks can be genetically classified by notes and octaves using the above spectrometric approach.

Harmonic Analysis
  Harmonic analysis is the branch of mathematics that studies the representation of functions or signals as the superposition of basic waves. It investigates and generalizes the notions of Fourier series and Fourier transforms. The basic waves are called "harmonics" (in physics), hence the name "harmonic analysis," but the name "harmonic" in this context is generalized beyond its original meaning of integer frequency multiples.

Harmonic Analysis is a widely accepted technique for assessing materials in a laboratory setting in the chemical industry. However, to date, it has not been commercially applied to classify subsurface geology or mineralogy using remote sensing geophysical technology from the ground surface. Unique harmonic energy frequency and phase peaks are produced and can be analysed in a number of ways producing a range of parametric statistical tests. Different rock types with different mineral assemblages will exhibit different spectral harmonic relationships over these levels.

Harmonic Phase
  The phase information is stored such that a pixel with a phase angle of zero will have an intensity of zero. The intensity increases linearly with phase angle, until almost 360 degrees.

P-Scan
  Profile Scan of the subsurface with fixed focus Antenna spacings at ground level. Both Transmitting and Receiving Antennas are moved simultaneously in parallel along the length of the scan line. This produces an image of the subsurface (from ground level) based on the two-way travel time of Adrok ADR Scanner's beams from Transmitter to Receiver Antenna. The WARR data converts the P-Scan time-stamps into depths in metres.

Survey Points
  The ground location of the Adrok Virtual Borehole scan (akin to the collar position of a physically drilled borehole)

WARR
  Wide Angle Reflection and Refraction scan to triangulate subsurface depths from the surface ground level. The Transmitting Antenna is moved at ground level along the scan line, away from the stationary Receiving Antenna which is fixed to the start of the scan line. Collected by ADR Scanner at ground level (that produces depth calculations).

The methods described herein are an extension of the techniques and apparatuses described in WO01/18533 and WO2013/186559. The latter of these documents, in particular, describes ADR modelling techniques, and in particular the obtaining of virtual borehole logs. The method described may be expressed in general terms using the flow diagram shown in FIG. 1.

FIG. 1 shows that, initially one or more scanning steps are performed, where an EM pulse is transmitted from a transmitter into the ground. The EM pulse is reflected from the boundaries between different subsurface layers and the reflected signals are received at a receiver. Transmitter and receiver may be of a type as described in WO 01/18533. The reflected signals can be processed to determine the depth and dielectric constant of each layer within the subsurface. Processing may involve conducting WARR and/or CMP analyses to produce depth information for the time registered image. This is integrated with profile scan data to provide a depth correlated image of the subsurface. Triangulation of each subsurface interface is enabled by ray tracing and NMO computations. The received signals, depth data and/or dielectric constant data are compared with known data (from physically drilled or cored boreholes) and also EM data collected from core samples in the laboratory to determine the type of material of each subsurface layer and its depth below ground. The determined material and depth information may be used to produce a virtual borehole log. This is a reiteration of the method described in WO2013/186559. A new step is now proposed (either in parallel with, or instead of, the step of determining the layer material. This step comprises using the determined depth and dielectric constants to determine at least one temperature, and preferably a temperature profile for the subsurface. The temperature profile may comprise a temperature value for each determined subsurface layer.

Other methods employ "chamber" modes in which a sample of material under investigation is enclosed in a chamber, the transmitter antenna being arranged to irradiate the interior of the chamber and the receiver antenna being arranged to receive signals modified by the interaction of the transmitted signals with the chamber and its contents. This method is particularly useful for typecasting particular substances.

Figure 2:
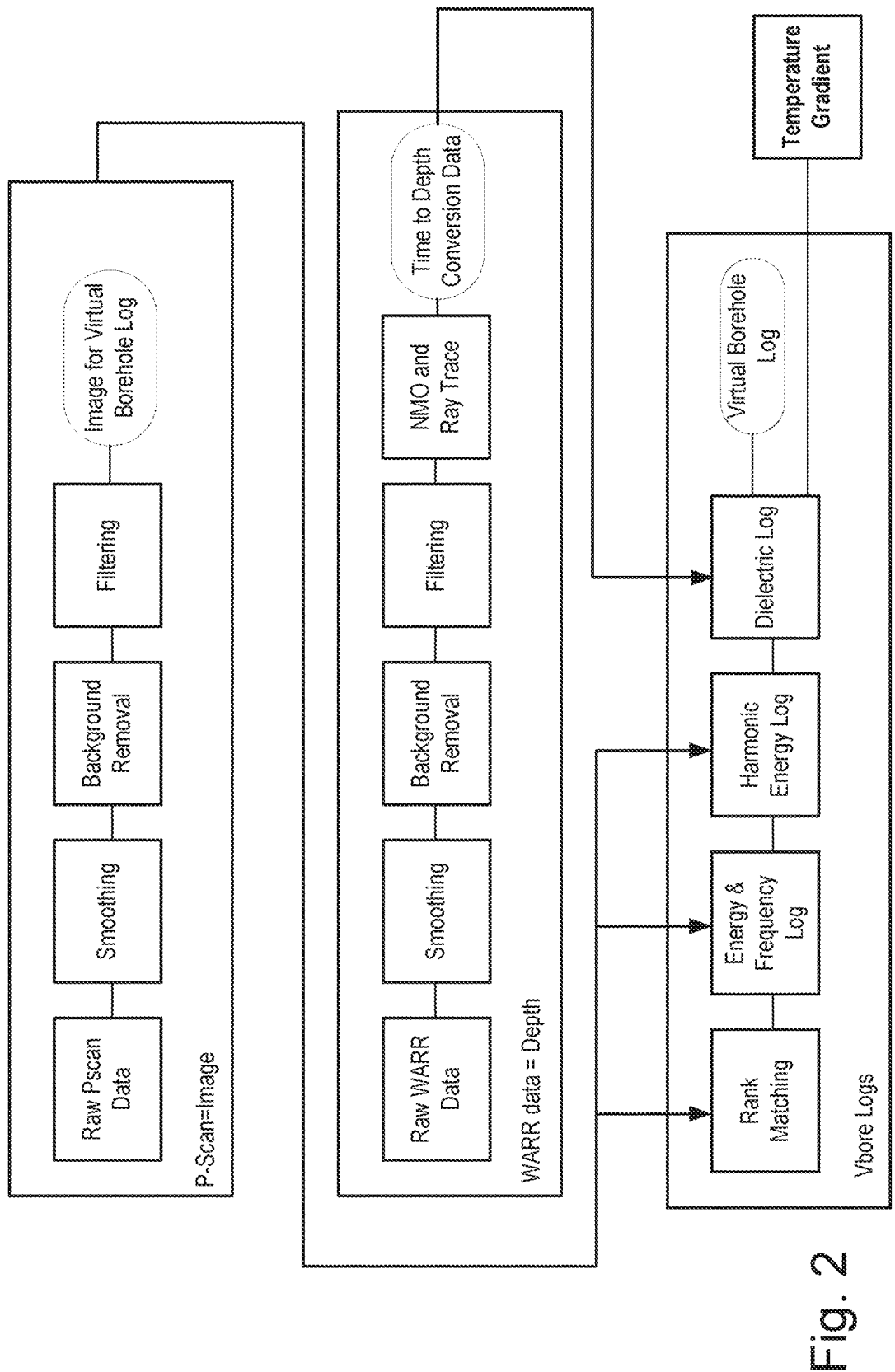
FIG. 2 is a flow diagram of the data processing elements forming part of a method according to an embodiment of the present invention.

FIG. 2 shows an overview of an embodiment of the main process described in detail below. It shows the process steps in obtaining a temperature profile, and also (optionally) a Virtual Borehole Log.

Atomic Dielectric Resonance (ADR)

The concepts described herein employ a technique known as Atomic Dielectric Resonance (ADR). ADR is an investigative technique which involves the measurement and interpretation of resonant energy responses of natural or synthetic materials to the interaction of pulsed electromagnetic radio-waves, micro-waves, millimetric or sub-millimetric radio-waves from materials which permit the applied energy to pass through the material. The resonant energy response can be measured in terms of energy, frequency and phase relationships. The precision with which the process can be measured helps define the unique interactive atomic or molecular response behaviour of any specific material, according to the energy bandwidth used. ADR is measurable on a very wide range of hierarchical scales both in time and space. Time scales may range from seconds to femtoseconds, and spatial scales from metres to nanometres.

One of the best ways of thinking about rock layers underground is to consider an "Einstein-type conceptual model" of relatively regular rock layers like shelves in a bookcase. Such an analogy can be readily visualised in the laboratory. Geologists should imagine themselves standing on the roof of the laboratory bookcase, above the top shelf, and scanning a line across the top-shelf roof, parallel to the shelves but looking vertically down at 90 degree depression angle to the horizontal. The ADR beam of radio waves and microwaves is first lased in the telescope and then it is launched into the air medium from the aperture of the telescope, from which it speeds up and then it hits the first interface, which is the top of the bookcase. It is transmitted through the top into the first empty shelf canopy which is air filled only (imagine no books on the top shelf) and then it hits the base of the shelf and is reflected back to the top. Because the beam is continually being pulsed and it is lased it now resonates up and down in a series of peg-legs between the top and bottom of the first shelf.

It is then forced by transmission to move down into the second shelf and repeat this process by resonating in a series of peg-legs between the top and bottom of the second shelf. The geologist should now imagine that the first four or five shelves are not empty (air-filled) but are made up of rectangular blocks of rock-sandstone, siltstone, shale, coal, etc. (so that the beam slows down through different dielectric layers depending on the variable dielectric constants). He will then see that the resonance (peg-leg reflections) between the top and bottom of each rock layer in each shelf are different and most important are measurable. The transmission times and delay times of the resonant reflections through each rock layer are variable depending on the rock physics parameters such as dielectric constants, absorbance, porosity, for example. In addition, there are special spectral associations related to the physical parameters such as energy, frequency and phase relationships and the statistical parameters associated with these spectral variables such as means, medians and modes together with minimum, maximum and standard deviations, for example.

This is the whole process of what can be described as "atomic dielectric resonance" (or ADR) of photon beams being transmitted through materials) and geologists can precisely map what happens to the confocal ADR laser beam as it is being transmitted through these layers. They can precisely track this beam as it progresses through the bookcase of rock layers, and as it passes through each layer software can tell the geologist the mean velocity through each layer, the mean dielectric constant, the delay times and three-dimensional dispersion of the beam with depth (in the radial Y-direction as it proceeds down in the Z-direction) so that they can map the three dimensional structure of the beam (which tells him its precise footprint through each rock layer). This is how the geologist can confirm that the laser beam of radio waves and microwaves is not only coherent but also confocal with an intensity pattern which slightly decreases with depth. The beam gradually narrows with depth as it goes deeper but the energy values with each layer are consistently high. This is why it is so useful for geologists involved in mineral prospecting because it can identify narrow veins with great precision.

Some aspects of the field and laboratory ADR equipment involve certain conditions being satisfied during the set up of the apparatus so as to obtain "standing wave oscillations" in ADR test sample chambers and/or in ADR remote sensing antenna system assemblies. In this respect, it is desirable to selectively control the group velocity of the radio wave and microwave radiation as it is emitted or "launched" by the transmitting antennas into the ground. In particular, for deep scanning the launch speed of the wave should be sufficiently slow to ensure that the wave can be accurately registered at a precise "zero time" location by the receiver antennas, after the pulse has been transmitted. The zero time position t(z) in remote sensing or t(0) in geophysics, is the start position for ADR range measurements and must be identified on the received ADR signal to determine the true time range (in two way travel time, (TWT—usually measured in nanoseconds)) represented by the received signal, returning from each resonant subsurface reflection layer.

The Wide Angle Reflection and Refraction (WARR) tracking method, which is one of the scanning methods comprised in ADR and will be described further, is able to (a) identify the upper and lower boundaries of each stratum, (b) determine the inter-layer beam velocity and mean dielectric constant of the material in each stratum and (c) identify the materials in the various strata from both the dielectric constants, known molecular or atomic spectral lines (after FFT Analysis of the received signals) and spectral ADR statistical parameters data-based for known rock types.

Three main measurements may be comprised in the proposed ADR method:

(1) Dielectric Permittivity Measurement

Conventional radar can locate objects in a less dense medium (e.g. a plane in the sky or a shallow buried object in the ground) because those objects reflect back some of the signal. Radar can also detect the dielectric constants of materials penetrated. Ground penetrating radar can therefore detect boundaries with different dielectric constants (rather as seismic detects changes in acoustic impedance). ADR is not depth constrained to the same extent as conventional ground penetrating radar is limited to very shallow depths.

ADR accurately measures the dielectric permittivity of materials encountered and determines the Dielectric Constant (DC) of each layer of rock to an accuracy of at least 1:400. With deeper penetration and a narrower ADR beam, the accuracy of dielectric mapping improves and at 1 km depth an accuracy of 1:4000 can be achieved for the mean dielectrics of narrow layers at this depth due to wavelength compression and confocal focusing of the beam with depth. The dielectric constant is basically a measure of how much a given material will slow down the ADR transmission signal. Determining the dielectric constant of each layer enables each rock layer to be mapped with a depth computation from ground level and can also determine physical properties of the rock layer, such as moisture content, porosity and density indices.

Dielectrics also allows preliminary identification of the composition of each layer e.g. shale or sandstone.

In general, dielectric measurements for hydrocarbon layers in the earth tend to be between two and five for an ADR Scanner as disclosed herein, if water is absent. In geological terms, the main effect on the signal velocity as it propagates through the material is the water content. For example, air has a DC of one, whilst water has a DC of approximately 80-81. Most geological materials lie within these boundaries.

(2) Accurate Depth Measurements (by Two Independent Methods)

The ADR Scanner can measure depths to each subsurface horizon that provides reflectance and a change of beam velocity. Two independent methods are proposed on order to calculate depths to each horizon: (a) normal move out (NMO), and (b) Ray Tracing. Only when both methods give the same depth measurement will that depth reading be accepted (this depth difference is called depth parallax). These depth measurements can be used to help tie-in or improve depth measurements made by seismic tools as well as radar or ADR tools.

(3) Spectrometric Measurement

The most important result of ADR's ability to penetrate all materials is that all the current imaging techniques of spectrometry become available to identify all materials encountered subsurface. Identification of these materials is based upon:

the computation of coefficients of absorption and reflection, transmission and emission of different wavelengths of electromagnetic radiation the calculation of combinations of spectral and statistical relationships for within group and between group spectral components in the returned signals e.g. energy/frequency/phase relationships After the subsurface has been divided into its geological horizons by determining its dielectric constant, spectrometry is used. The principle is as follows. The ADR system analyses many components of the return signal from a location where the geology is known and learns what return signals each material emits (i.e. the material is "typecast"). When ADR encounters an unknown material in the subsurface, it performs a comparison of the return signals obtained from that material with the contents of a database of known typecast materials until it finds a match. The material encountered is then identified within statistical accuracy parameters. For example, oil bearing sands, water bearing sands and shales encountered in previous wells are typecast in an area. Then the ADR response from a target formation in an undrilled prospect is compared to those typecast formations until a match is achieved. This identifies the undrilled target formation within error limits and within specified degrees of statistical significance. The database may include signatures of many different rocks containing different combinations of oil, gas, water, etc. Ultimately ADR will be able immediately to classify any formation encountered by comparing it with this database. Other, already existing databases can also be used. These include NASA's JPL spectral library or the NIST Atomic and Molecular Microwave Spectra Databases.

Output

For the oil and mining industry ADR may be used to generate a virtual well log i.e. information equivalent to that derived from a drilled and logged well, and now a (corresponding) temperature profile.

The output may take the form of:

1. Spectrometric material classification of subsurface layers—e.g. Virtual log providing material classification
2. Image of the subsurface—e.g. Profile scan
3. Logs:
a. Dielectric Log —showing dielectric permittivity curves—a dielectric curve is produced by processing the WARR image. Hyperbolic curves are fitted to image features, the severity of the curve determining the dielectric constant of that layer. A specific example uses a WARR sampling interval of 2.5 m and utilise two depth calculation algorithms (NMO and Ray Tracing) to produce accurate depth information from the dielectric curve fits by accurate parallax measurements over a number (e.g., 15) equally spaced cross positions which divide the hyperbolic curve and are used to test and measure any parallax measurements at each cross point of the curve so that the curve may be accurately defined to measure the best probable mean depth for the horizon.

b. Energy Log: the energy log is produced by sub-sampling the P-Scan image data in equal time intervals. A Fourier Transform is conducted on each sub-image, whereby the energy and frequency content is computed. A mean energy decibel value is calculated for each sub-image, which provides the energy reading at that depth.

c. Weighed Mean Frequency: the weighed mean frequency (WMF) log is produced by sub-sampling the P-Scan image data in equal time intervals. A Fourier Transform is conducted on each sub-image, whereby the energy and frequency content is computed. The frequency values are then modulated with the energy values to produce the WMF reading per depth interval; and 4. Temperature profile.

Outputs of the Dielectric Logs and the Virtual Logs can be provided, for example, in ASCII format, to allow a client to input these measurements into their own software models of the survey site(s).

Scanning Techniques

The following sections outline a number of scanning techniques that may be utilised. These comprise:

1. Profile Scans (or PScans) with a fixed base separation between Tx and Rx antenna(s). These show a 2-Dimensional (2D) cross-section of the material(s) under inspection with distance on the x-axis and time on the y-axis; and 2. Wide Angle Reflection and Refraction (or WARR Scans) which converts y-axis of PScan and/or Stare scan data into depth units (by measurement triangulations between Tx and Rx antenna(s)).

3. Common Midpoint (CMP)

4. Transillumination

5. Stare scan

In each case, the antennas can be used in a variety of ways. The following list is a selection of the ways in which they can be used:

Monostatic—one sensor acts as a Transmitter (Tx) and a Receiver (Rx), however direct depth calculation cannot be achieved by this method unless the permittivity of the materials of propagation are known prior to data analysis Bistatic—consists of two antennas, one Tx and one Rx. These can be moved together or independently which provides great flexibility in the type of measurement that can be performed.

Array—consists of either:
a) One Tx and more than one Rx
b) One Rx and more than one Tx
c) More than one Tx and More than one Rx Array sizes are normally limited by the physical space in which to scan, the electronic systems available to collect multiple data channels and the cost and complexity involved in developing such systems.

Note that "monostatic" and "bistatic" do not mean that the antenna systems are stationary as they can be moved and operated in any axis.

All the different scan types described below can be used to develop a database of known situations or materials (depending on how they require to be scanned). This database becomes a reference datum for other measurements and spectral matching techniques can be employed to match unknown situations/materials to the known situations. A description of the scan types employed by the Inventor follows after a general overview of the transmitter and receiver techniques employed.

Transmitting EM Pulse and Receiving Reflected Signals

Figure 3:
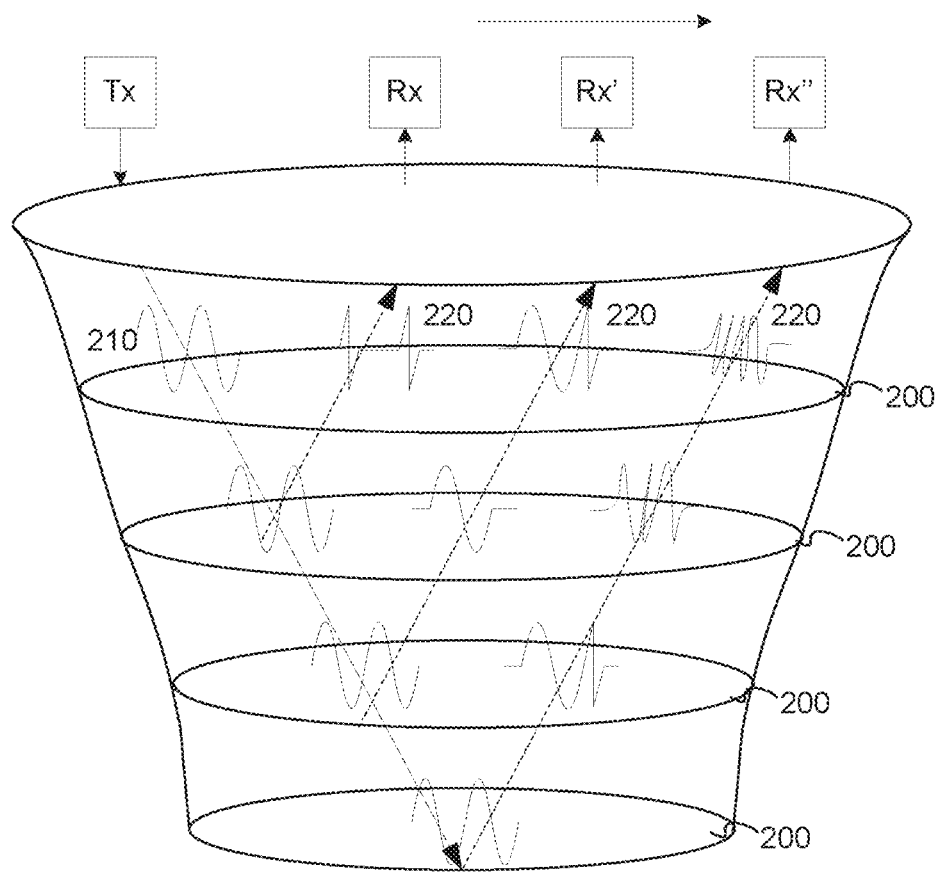
FIG. 3 is an illustration of a survey site during three phases of a survey scan.

FIG. 3 shows a survey site during three phases of a survey scan (here a WARR scan). Shown is a transmitter Tx and a Receiver Rx, Rx' Rx" in three different positions. Also shown is the subsurface comprising a number of reflective horizons 200, defining subsurface layers within the confocal elliptical (or circular which is a special type of ellipse) beam footprint. At each of these horizon interfaces (where the dielectric constant changes in value), the transmitted signal 210 is reflected. Features of the signal are altered by subsurface features resulting in a return signal 220 with unique signature depending on the path taken by the signal between transmitter and receiver and the subsurface composition/geology through this path. In particular, each of the layers of the subsurface has a dielectric constant. The dielectric constant of a subsurface layer affects the rate of propagation of the transmitted signal through the material of that layer. For example, if the mean layer dielectric constant is 9 (a typical value for limestone rock) then the rate of transmission of the signal propagated through this limestone layer will be three times (SQRT(9)) slower than the speed of light in free space.

The transmitted signal travels through the layers of the subsurface. Some of the energy of the signal is reflected by each boundary between the layers. The remainder of the energy in the Signal continues through the further layers. The reflected signals are received at the receive antenna some time after signal transmission. The time of receipt of the reflected signal is dependent on the dielectric constant of the material(s) of the subsurface layer(s) travelled through and the thickness of the subsurface layer(s). In addition, the transmitted pulse may be refracted at the boundary between the layers according to Snell's Law.

The signal 210 is initially sent to the transmitting antenna where it is conditioned before being launched remotely, e.g. vertically or at a declined look-angle into the ground. The transmitting antenna contains dielectric lenses that helps focus the signal inside and outside the antenna aperture, which provides the first major measurement datum of the antenna. The dielectric lenses helps condition the velocity with which the signal exits the end aperture of the antenna before it is sent into the ground. If the exit velocity is 4 times slower than the speed of light, for example, and the internal lasing distance or standing wavelength between the telescope mirrors is 90 cm in length, then the exit wavelength from the aperture will be four times longer than 90 cm, giving an exit wavelength into air (with a dielectric constant of 1) of 3.60 m. The Tx Transmitting MASER telescope is then said to have a "numerical aperture" of 4 and the Tx-MASER is described as behaving like a Tx-MASER four times longer if the mean dielectric between the mirrors were air. To explain how this numerical aperture is calculated, the Cylindrical Tx Maser may be fabricated with two concentric cylindrical lenses between the two plane mirrors which laser the transmitted beam into coherent standing waves. If the inner (Core) concentric lens has a dielectric constant of 49 and the outer(annulus) cylindrical ring lens has a dielectric constant of 9, then the numerical aperture of the MASER is calculated by the formula ((SQRT(core) minus SQRT(annulus))=(SQRT(49)−SQRT(9))=(7−3)=4.

The optimum lasing performance of the antennas was achieved by selection of appropriate dielectric lens configurations to optimise the standing wave effects within the transmission chambers and minimise aperture attenuation. The best lasing performance for imaging can be achieved by plotting of the Transmission Coefficient (S21, dB) against frequency, which shows a progressive standing wave transmission through the chamber with sequential pulsing nodes at key frequency levels but a balanced pure input reflection coefficient (S11, dB) when plotted against frequency.

The production of the pulse triggers a signal to be sent to the receive circuitry to listen for reflected signals from subsurface features. The reflected signals 220 are collected by the receive antenna Rx, amplified in a pre-amplifier and then have a time varying gain applied. The time varying gain increases the level of gain as the time from EM pulse transmission passes. This compensates for the increased attenuation of the reflected signal with depth travelled. The reflected signals are then passed through an analogue to digital converter (ADC) and stored within the receive antenna apparatus. The storage of reflected signals at the receive antenna apparatus allows the data to be transferred to a data logger and/or data processor at a later time. Additionally or alternatively the reflected signals may be transmitted across a data link to a data logger and/or data processor. Data can be backed-up and removed on a removable storage device (such as a flash drive).

Figure 4:
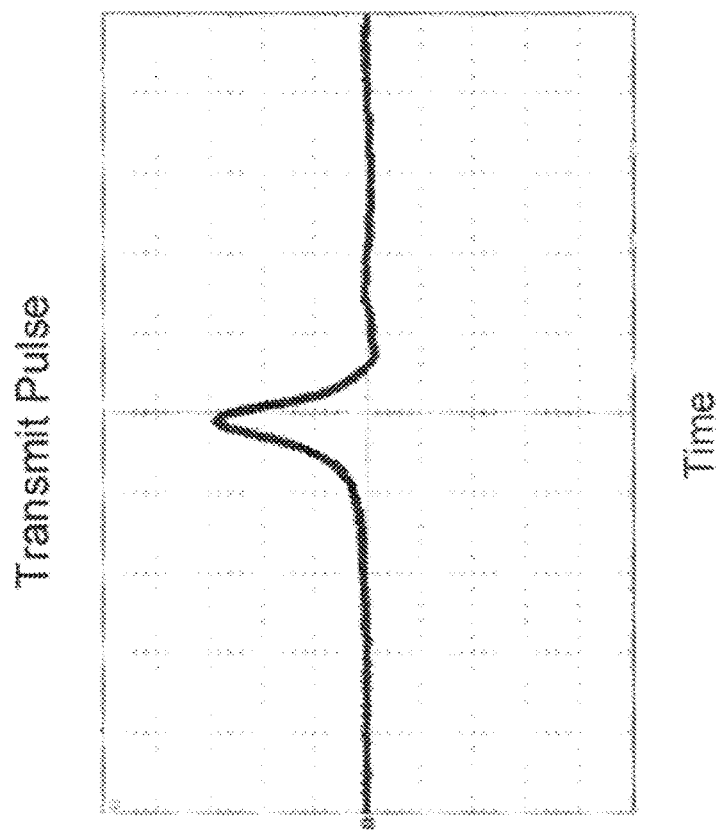
FIG. 4 is a time domain representation of a transmitted EM pulse transmitted in embodiments of the invention.

A time domain representation of the transmitted EM pulse is shown in FIG. 4. The y-axis of this image shows Energy (or amplitude, represented by 0 to 100%) and the x-axis represents time (typically in nanoseconds, ns). The amplitude of the pulse displayed can be seen to be 1.5 volts from the major tick marks at 0.5 volt intervals. Note the 500 mv scale is stated bottom left.

The transmitted waves have two components: (i) a long wave front standing wave to obtain deep penetration; and (ii) shorter resonance waves within the standing wave to enhance vertical resolution.

Profile Scanning (P-Scan)

Profile scanning (P-scan) is a type of scan used to produce an image of the subsurface. It can also be used in spectral analysis, whereby different sub-images are used to match against the control databases. Sub-images are generally in two forms:

Fixed time (vertical) across the whole area to be analysed
Fixed time (vertical) across part of the area to be analysed A P-Scan is conducted by holding transmit and receive antennas at a fixed separation, and moving these antennas along a measured lateral distance along a ground surface line (with the antennas pointing vertically downwards with their apertures being supported in air above the ground with a vertical air distance to the ground usually between ⅓ and ½ of the maser measured wavelength distance between the plane mirrors within the transmitting-Tx telescope), called a survey line. Electromagnetic (EM) pulses are transmitted vertically (or at an angle off-vertical) into the subsurface as the transmit and receive antennas are moved along the survey line. Each transmitted EM pulse is reflected from features within the subsurface to produce, at the receive antenna, a continuous signal trace.

The amplitude of the signal received from a reflector varies with the propagation coefficient of the material through which the pulse is transmitted, which is related to the dielectric constant of this material. Because a resonant (ringing) pulse has been generated, the pulse also being optimised by lasing, it is possible to observe the reflected ringing pulse. Of particular interest is the modulation of the rings, which can be used as a diagnostic tool to identify material types. Modulation effects can be studied by energy, frequency and phase relationships caused by the modulated ringing reflections. It is then possible to mathematically evaluate the returns by typecasting different materials in the laboratory under controlled boundary conditions such as (a) totally dry rocks (e.g. cooked in a microwave to remove all moisture) and (b) totally saturated in water (over 10 days for example) to study responses of totally saturated rock materials.

A number of P-Scans are conducted along a survey line. The scan traces may be placed adjacent to one another in order to produce a P-Scan image wherein the amplitude of each scan trace is represented (either numerically or by digital image display in black and white tones or in colour tones which are usually false colours but simulated true colour tones can also be produced, like reality) by contrast to show the subsurface layers. The P-Scan image has two axes: an x-axis comprising the number of P-Scan traces that are placed adjacent to each other to obtain the image, which is proportional to distance along the survey line; and a y-axis that comprises the time after EM pulse transmission of receipt of the reflected signal.

The P-Scan is usually a time domain measurement, with time in the y-axis (and time logged between scan traces or counted numerically between scan traces, labelled on the X-axis). The depths obtained from a WARR Scan or CMP scan (see below) can be applied to the P-Scan to give the P-Scan a depth dimension in the y-axis (and if the length of the survey line is measured precisely with appropriate marked fix points along the way—e.g. at 1 m intervals or 5 m intervals for a survey line of 50 m or 100 m in length, then the x-axis can be labelled in metres or in imperial scales to suit survey or client requirements). For accurate geological subsurface analysis, e.g., where slope measurements are important, the P-Scan are usually rectified and scaled with common scales on the X and Y axes so that precise slopes of ascending or descending layers (or image features) may be calculated.

WARR Scanning

The WARR analysis method generates information about the sub-surface reflectors that the ADR signals propagate through and are reflected from. WARR analysis is time based and utilises two calculation methods that individually calculate a travel time to and from the sub-surface reflectors. The calculation methods are called NMO (Normal Moveout) and Ray Tracing. Both methods are widely used in seismic data processing. From this travel time, three important factors can be derived, firstly dielectric constant of the material through which the signal has been propagated. Secondly the velocity of propagation of the signal through the dielectric layer and thirdly, the thickness of the layers that the signal has propagated through can be derived from the radar range equation and summed to provide an overall depth of penetration from the sensor datum (for example, the ground surface).

WARR scans are conducted over a set horizontal distance, whereby the first half of the horizontal line contains data, averaged over the horizontal distance, regarding the depth information to reflectors.

A WARR Scan is conducted by holding one of the transmit antenna or the receive antenna stationary and moving the other of the transmit antenna or the receive antenna across the ground over a survey line of the survey site. In the example shown in FIG. 3, the transmit antenna remains stationary and the receive antenna is moved away. The separation of the transmitter antenna and the receive antenna increases in equal separation distances, s. Alternatively, the location of the transmit and receive antennas may be derivable using a positioning system such as the GPS and the separation calculated accordingly. EM pulses are transmitted vertically (or at an angle pointing downward to the ground) into the subsurface and the reflected to the receive antenna at each separation. The transmitted and reflected signals are shown in FIG. 3. In practise, and in particular for deep range scans, it is preferable to keep the very sensitive Rx-Receiver stationary, especially if sensitive pre-amplifiers are used, to increase the sensitivity of deep range return signal reflections, and in this case move the Transmitting Maser Tx-Telescope.

In one embodiment, it is proposed to collect data at a survey site for post processing by conducting a P-Scan over a series of survey lines at the site, and conducting a WARR Scan over the same survey lines. The P-Scan provides an image of the subsurface and the WARR Scan provides depth and dielectric constant data for each of the subsurface layers. In practise, and in order to provide a comprehensive survey evaluation of complex subsurface folded and dipping stratigraphic layers with vertical or angular igneous or mineral intrusions, it is preferable to conduct forward and reverse P-scans and WARR scans along each survey line and repeat each scan line at the same data collection speed at least twice, also collecting Stare scans at (at least) the start, middle and end of each survey line, or at regular intervals of 1 m or 5 m (e.g.) depending on the survey objectives.

Common Mid Point scan

Like a WARR scan, a Common Mid Point (CMP) scan can be used to determine the depth to a reflector or subsurface horizon. This method is employed by moving both the Tx and Rx antennas away from one another in equal distance steps, or at equal velocities, from a common point. By doing this the same reflection point will be maintained. The depth to the reflector is then derived from the following equation, assuming two measurements have been recorded away from the common point:

$$d_n = \sqrt{\frac{x_{n-1}^2 t_n^2 - x_n^2 t_{n-1}^2}{t_{n-1}^2 - t_n^2}}$$

where,
x=antenna separation distance between Tx (transmitting ADR Maser) and Rx (receiving ADR Antenna) measured in metres
t=two way travel time (measured in nanoseconds)

This method is repeated until the depth to all reflectors seen in the ADR images have been recorded, the velocities of which can be derived from the aforementioned equations.

The derivation of the above equation is as follows:

In a homogeneous material, the relative velocity, $V_r$ is equal to:

$$V_r = \frac{c}{\sqrt{\varepsilon}}\ ms^{-1}$$

Therefore the depth, d can be derived as:

$$d = V_r \frac{t}{2}\ ms^{-1}$$

where,
$\varepsilon_r$=dielectric constant (i.e. relative permittivity with reference to the speed of light (c))
t=measured travel time to the reflector (the 2 in the equation related to the two way travel time, meaning the signal travels to the target and back again)

Trans-Illumination Scan

For a Trans-illumination scan the Tx and Rx antennas are directed toward one-another. They can be held stationary, moved in tandem, or moved independently (i.e. like a WARR scan) to produce image and depth information. The processing required for each will depend on the scan type and the geometries involved.

Stare Scan

The Tx and Rx antennas are held at a fixed separation and do not move, i.e. stare like a camera taking a long exposure. Data is collected over a period of time to build up an image of that area under observation and from this image also to detect any moving targets by computing Doppler Radar Time shifts, velocity changes and phase and frequency changes. The moving geological targets may relate to seismic or volcanic events or it may be water percolation or oil seepage in the ground or steam diffusion in "steam chests" related to oil extraction from reservoirs by the "steam injection" method Antennas can then be moved to another point whereby the same measurement can be repeated.

Images generated this way can be added together to make a synthetic P-scan or WARR image. Stares are very useful for spectral typecasting of target signatures.

Look-Angle of Antennas

It is important for determining the best look angle and Ray Path spacings for focusing the Transmit and Receive antennas at the start of a WARR and for fixed spacing P-scans.

Figure 5:
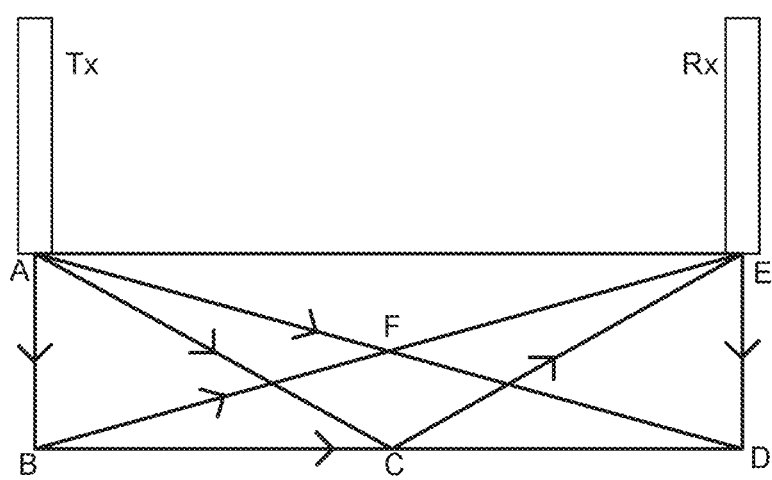
FIG. 5 is an illustration of the axial ray paths between transmitter and receiver.

FIG. 5 shows an example with a one metre spacing between Tx and Rx and a 40 cm height above the ground surface. Note that only the axial ray paths have been drawn. Of note are the time delays for each of the important ray paths.

These are summarised:
(1) AE—the direct shortest air path=3.281 ns (=BD)
(2) ACE—the symmetrical mid ground reflection path=4.202 ns
(3) ABE (Nadir Tx) and ADE (Nadir Rx)=4.846 ns
(4) ABDE—The long way round (Bookcase effect)=5.906 ns These are the principal axial ray paths for four ray bundles and this information plus the averages can be used to precisely identify the ground surface on any image for this field condition.

Depth Scan Data Processing

In practice the method of determining depth and dielectric constant from the raw WARR data involves user input to processing software. The user input is characterised by fitting hyperbola to a WARR Scan image. A WARR Scan image may comprise adjacent scan trace data collected during a WARR Scan. A typical WARR Scan image shows time on the y-axis and separation distance between the transmit and receive antennas on the x-axis. The subsurface layers are shown at an angle as the reflected signal takes longer to reach the receiver at greater separations of transmit and receive antennas. Although the WARR Scan image may appear to show a linear increase in reflection time with distance, the actual increase is hyperbolic.

The user of the software therefore firstly inputs a first layer boundary (horizon) on the WARR Scan image to represent the end of the air wave. This is done by placing on the image a series of equally spaced markers (as crosses) that combine to define a hyperbolic polynomial. The air wave is the transmission of the EM pulse from the transmit antenna into the ground, which is received directly by the receive antenna through the air. The input of the first horizon is done visually by the user. The first horizon is used as a reference for further horizons as it represent to and, as the medium is air the dielectric constant is 1.

Subsequent horizons are fitted to the WARR Scan image in the same way (i.e. visually by the user). The horizons are then "tested" to see whether they are consistent with both NMO and ray trace methods of determining depth (see below). That is by examining the parallax differences between the NMO positions and Ray Tracing positions at each equidistant cross point. If there is a match (i.e. no parallax at the cross positions) then the manually input horizon can be fixed and the average dielectric constant determined between the last horizon and the current horizon determined.

Normal Move-Out (NMO) and Ray Tracing

The WARR analysis method can be used to generate information about the sub-surface reflectors that the ADR signals propagated through and were reflected from. Alternatively, the Common Mid-Point (CMP) method may be used to generate depth information for the ADR scans. WARR analysis is time based and utilises two calculation methods that individually calculate a travel time to the sub-surface reflectors. From this travel time, two important factors can be derived, firstly dielectric constant of the material through which the signal has been propagated. Secondly, the thickness of the layers that the signal has propagated through can be summed to provide an overall depth of penetration from the sensor datum (for example, the ground surface).

In order to track discrete layers within the material(s) under inspection, a pixel filter may be applied in X and Y on the WARR scan image (e.g., usually a 3 by 3 filter in X and Y) to smooth out random signal undulations. Layers are then picked for WARR tracking, which enables the fitting of a hyperbolic polynomial to compute depth in the Y direction by two methods: (i) normal move-out (NMO); and (ii) ray-tracing (RT). This WARR program selects a unique depth solution once the NMO depth equals the RT depth.

It is assumed that under the ground there are a series of horizons which reflect the ADR signal. It is also assumed that the axial signal obeys Snell's refraction law:

$$\frac{\sin i}{\sin r} = \frac{v_i}{v_r}$$

where i and r are the angles of incidence & refraction, and $v_i$ & $v_r$ are the incident & refracted signal speeds.

The reflection times for each horizon for a range of antenna separations are recorded. Using Snell's law, the horizon depths can then be computed by the ray tracing method. The NMO method is an approximation to ray tracing for small angles of incidence and gives the same result for the topmost horizon. It is simpler to implement and is more stable for larger angles.

If $D_i$ and $T_i$ are the distance and times between adjacent horizons then for NMO the time for a given antenna separation X for the reflected signal from the $i^{th}$ horizon is:

$$4\sum (T_i)^2 + X^2 \frac{\sum T_i}{\sum \frac{D_i^2}{T_i}}$$

where $D_i/T_i$ is the signal speed $V_i$ in layer i. $T_i$ is the time for a vertical signal to pass through a layer. $DC_i = (C/V_i)^2$ is the dielectric constant in layer i, where C is the speed of light.

By adjusting the horizon depth and signal speed interactively horizon by horizon to match the displayed horizons, the horizon depths and dielectric constants can be determined.

The time offset for the image can be determined by fitting the direct wave T=X/C.

Putting this theory into practise involves Data Processing operator(s) firstly setting the time zero of the recorded pulse. This finds the air wave that is travelling between the Tx and Rx antennas and is then used as a measurement datum for the remainder of the WARR fittings.

Subsurface layers are tracked on an ADR image by fitting hyperbola to the layers of the image. The operator gains confidence in the fact a layer is present at a particular position when the results of the NMO and Ray tracing methods are similar (this is when the crosses on the screen do not move vertically (which is parallax changes in time) when each method of calculation is selected. If there is parallax of the crosses then it is apparent that there is 'no' mathematical solution to that curve at that particular cross position and another curve with a different slope aspect should be found in order to remove the parallax at that particular cross position. This parallax is removed through the software operator changing two variables: the input depth and/or dielectric constant parameters, the dielectric constant changing the severity of the hyperbolic curve. Once the eccentricities in the shape between the NMO and Ray tracing curve has been removed (which is minimised by careful adjustment of the four coarse to fine positional buttons and four coarse to fine dielectric buttons) then the layer is deemed to be a good fit.

Temperature Evaluation

Up to now, the above techniques have been used in determining the composition of a material, or of the subsurface. As mentioned, it has now been determined that such techniques can be extended for determining temperatures of a material, and in particular temperatures of subsurface layers. Such methods may be useful, for example, in geothermal energy applications.

Historical Introduction to Theory

It is known that "The equilibrium radiation that establishes itself in an isothermal cavity enclosed by completely absorbing walls may be observed experimentally through a very small hole in the wall of such a black body". This is also the case if an isothermal cavity enclosed by completely absorbing walls is placed next to the pin hole aperture in an ADR Test Chamber.

The intensity of the black body radiation proved to be a function of temperature and frequency only and not dependent on the specific properties of the wall dielectrics. This implies that the temperature of the radiation is a function of frequency and amplitude only. This is the basis of the temperature modelling techniques disclosed herein, and specifically of temperature modelling of moving field WARR scans and stationary field Stare Scans.

Thermodynamics and statistics should be able to calculate the black-body spectrum. The Stefan Boltzmann Law states that the energy density p of the radiation in the cavity should increase with the absolute temperature T as:

$$\rho = \sigma T^4$$

where $\sigma$ is the Stefan Boltzmann constant.

It can also be shown that the spectral energy density $\rho\lambda$ contained in a wavelength range between $\lambda$ and $(\lambda+d\lambda)$ must rise with the fifth power of the absolute temperature.

In addition, it can be shown that the proportionality factor in the spectral density equation can depend only on the product of wavelength and temperature:

$$\rho\lambda d\lambda = T^5 f(\lambda T) d\lambda$$

It is known that the experimental characteristic of $f(\lambda T)$ plotted as a function of the wavelength traverses a maximum at some wavelength $\lambda$ max, and that at $\lambda=\lambda$ max, the differential of $\mu\lambda$ with respect to $\lambda$ for a fixed temperature is zero. This is essentially Wien's Displacement Law, which shows that the wavelength of highest radiation density shifts proportional to 1/T, and may be written as:

$$\frac{df(\lambda \max \cdot T)}{d\lambda} = 0 \text{ or } \lambda \max \cdot T = A$$

where A is the Wien's displacement constant.

However the evaluation of the function $f(\lambda T)$ requires a statistical approach. Classical statistics leads to the principle of the equipartition of energy which claims that each degree of freedom of a system in thermal equilibrium contains the same average energy:

$$\varepsilon = \tfrac{1}{2} k\, T$$

where k is the BOLTZMANN or Molecular Gas Constant.

But by applying this principle to the radiation problem, classical physics arrived at theoretical conclusions in complete variance to the experimental facts. This problem was solved by the Planck radiation law. This law for the spectral energy density in the frequency range between v and v+dv is:

$$P v\, dv = \frac{8\pi \hbar^3 dv}{c^3 e^{\hbar v/kt}}$$

Where $\hbar$ is the universal Planck constant. From this, it can be seen that the energy content of the linear oscillators lining the walls of the black body as well as the energy content of the radiation field itself is parceled in energy quanta or photons ($\hbar v$).

The important point to note is that if Energy distribution ($\rho$) is plotted against Wavelength ($\lambda$), then the peak in the energy output shifts to shorter wavelengths as the temperature increases. In the visible part of the spectrum, there is a perceived colour shift towards the shorter BLUE wavelength. From this, the Wien Displacement Law was formulated, which states that:

$$T\lambda \max = \frac{1}{5c2}$$

where $\lambda$ max is the wavelength at which the temperature reaches a maximum temperature T and c2 is the second radiation constant.

Proposed Method-Theory

Field Experiments under controlled conditions have shown clear evidence of beam focusing in the Fresnel, Transition and Fraunhofer Zones when performing WARR scans. In this example, the WARR Scan was conducted over a Transmitter-Receiver separation of 100 m. The look direction was vertically upwards through the roof of a mine for a range of 640 metres with the beam passing through a known river body at 630 m known range. The tracking was carried out 10 m above the river surface to give a good air column for dielectric calculations. The Horizon Layers included in Tables 1(a), 1(b) and 1(c) are all verified dielectrics from three independent WARR scans at the Z-depth ranges (m) listed in column 2 of the tables.

Tables 1(a), 1(b) and 1(c) show a dielectric table of beam parameters for WARR scans at X-Positions (a) C2, (b) C8 and (c) C15 positions over 100 m where C2 is near the start, C8 is precisely at the middle and C15 is precisely at the end of the 100 m long WARR scan. Receiver Rx was a stationary receiver on a tripod at Chainage 0 m for the full WARR scan and transmitter Tx started scanning at position C2 (Table (a)) at Chainage 1 m; at position C8 (Table (b)) at Chainage 50 m and at position C15 (Table (c)) at Chainage 100 m. Yd-Bw is beam width (Bw) computed as the beam diameter in the Y-Z plane (Yd), in metres. Yv-Bv is beam volume (Bv) computed in the Y-Z plane (Yd), in m$^3$.

TABLE 1(a)

| Horizon | Z-Range (m) | Dielectrics C2 | Yd-Bw(m) | Yv-Bv(m^3) | (C2)$\lambda$ (m) | Br = (Bv/$\lambda$) | Medium |
|---|---|---|---|---|---|---|---|
| H1 | 3.8 | 1 | | | 10.702 | | air |
| H2 | 5 | 2.92 | 0.196773751 | 0.03647692 | 7.192 | 0.005071874 | rock |
| H20 | 50 | 5.80010156 | 0.027908093 | 0.00152991 | 0.396 | 0.003863402 | rock |
| H40 | 100 | 6.98576616 | 0.013514586 | 0.00035877 | 0.189 | 0.001898228 | rock |
| H80 | 200 | 8.25677237 | 0.006738439 | 8.92E−05 | 0.088 | 0.00101354 | rock |
| H120 | 300 | 11.2650182 | 0.003890758 | 2.97E−05 | 0.058 | 0.000512679 | rock |
| H160 | 400 | 7.72128484 | 0.003619184 | 2.57E−05 | 0.043 | 0.000598353 | rock |
| H200 | 500 | 5.14545709 | 0.003639627 | 2.60E−05 | 0.033 | 0.000788506 | rock |
| H240 | 600 | 11.1417099 | 0.002068614 | 8.41E−06 | 0.027 | 0.000311315 | rock |
| H249 | 622.25 | 36.9854617 | 0.001110534 | 2.42E−06 | 0.026 | 9.32112E−05 | Last sediments |
| H253 | 630.046 | 79.5549459 | 0.000757147 | 9.40E−07 | 0.025 | 3.76017E−05 | water |
| H259 | 640.34 | 1.00225691 | 0.006446777 | 3.91E−05 | 0.025 | 0.001563524 | air |

TABLE 1(b)

| Horizon | Z-Range (m) | Dielectrics C8 | Yd-Bw(m) | Yv-Bv(m^3) | (C8)$\lambda$ (m) | Br = (Bv/$\lambda$) | Medium |
|---|---|---|---|---|---|---|---|
| H1 | 3.8 | 1 | | | 3.442 | | air |
| H2 | 5 | 4.15323323 | 5.475443494 | 28.243755 | 2.9 | 9.739225862 | rock |
| H20 | 50 | 5.53162176 | 3.57953644 | 3.57953644 | 0.396 | 9.039233434 | rock |
| H40 | 100 | 6.90827629 | 0.66000012 | 0.85564317 | 0.189 | 4.527212524 | rock |
| H80 | 200 | 8.23403025 | 0.328825378 | 2.12E−01 | 0.089 | 2.38641136 | rock |

TABLE 1(b)-continued

| Horizon | Z-Range (m) | Dielectrics C8 | Yd-Bw(m) | Yv-Bv(m^3) | (C8)λ (m) | Br = (Bv/λ) | Medium |
|---|---|---|---|---|---|---|---|
| H120 | 300 | 11.2545488 | 0.191541583 | 7.21E-02 | 0.058 | 1.242518345 | rock |
| H160 | 400 | 7.71495066 | 0.176367717 | 2.57E-05 | 0.043 | 0.000598353 | rock |
| H200 | 500 | 5.14110276 | 0.176687355 | 6.13E-02 | 0.033 | 1.858239394 | rock |
| H240 | 600 | 11.1389063 | 0.101676899 | 2.03E-02 | 0.027 | 0.752117148 | rock |
| H249 | 622.25 | 36.9825438 | 0.054292768 | 5.79E-03 | 0.026 | 0.222786538 | Last sediments |
| H253 | 630.046 | 79.5523816 | 0.03688148 | 2.23E-03 | 0.025 | 0.08922032 | water |
| H259 | 640.34 | 0.99924826 | 0.315142468 | 9.34E-02 | 0.025 | 3.73622184 | air |

TABLE 1(c)

| Horizon | Z-Range (m) | Dielectrics C15 | Yd-Bw(m) | Yv-Bv(m^3) | (C15)λ (m) | Br = (Bv/λ) | Medium |
|---|---|---|---|---|---|---|---|
| H1 | 3.8 | 1 | | | 1.779 | | air |
| H2 | 5 | 3.001 | 13.32996719 | 167.394812 | 1.536 | 108.9809972 | rock |
| H20 | 50 | 4.87102556 | 52.93373948 | 52.9337395 | 0.396 | 133.6710593 | rock |
| H40 | 100 | 6.68522394 | 2.611835628 | 13.3997391 | 0.189 | 70.89809037 | rock |
| H80 | 200 | 8.1656 | 1.311697231 | 3.38E+00 | 0.089 | 37.97360734 | rock |
| H120 | 300 | 3.70116035 | 0.765227183 | 1.15E+00 | 0.058 | 19.83158578 | rock |
| H160 | 400 | 7.69629661 | 0.705038726 | 9.76E-01 | 0.043 | 22.70712484 | rock |
| H200 | 500 | 5.12859433 | 0.706484722 | 9.80E-01 | 0.034 | 28.83575253 | rock |
| H240 | 600 | 11.130097 | 0.406617657 | 3.25E-01 | 0.027 | 12.02855233 | rock |
| H249 | 622.25 | 36.9745201 | 0.217146393 | 9.27E-02 | 0.026 | 3.563774615 | Last sediments |
| H253 | 630.046 | 79.5434071 | 0.147509096 | 3.57E-02 | 0.025 | 1.42719952 | water |
| H259 | 640.34 | 0.99174642 | 1.260569873 | 1.49E+00 | 0.025 | 59.77954952 | air |

Figure 6:
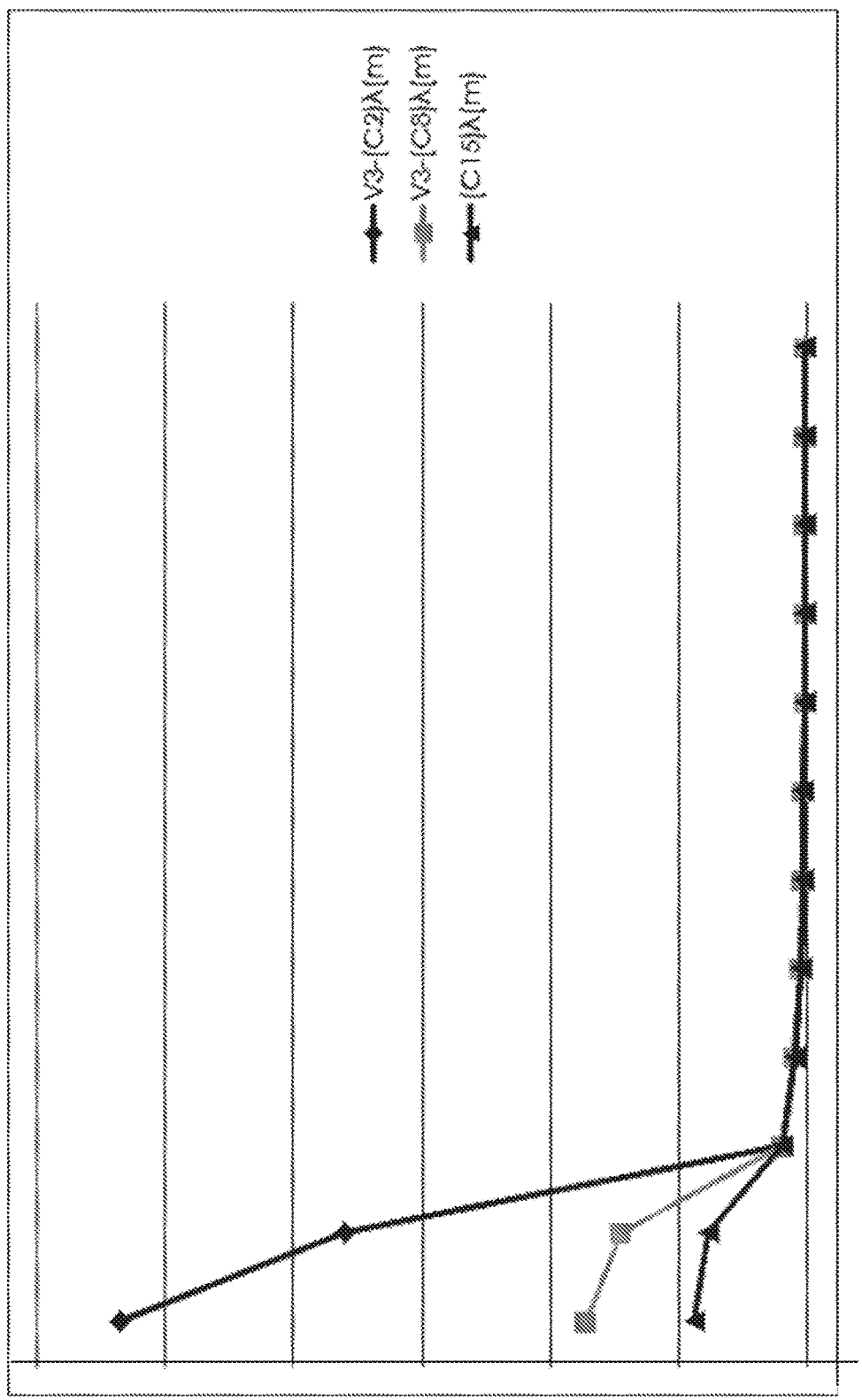
FIG. 6 is a graph of beam wavelength against depth based on the data of Tables 1(a) to 1(c)
Figure 7:
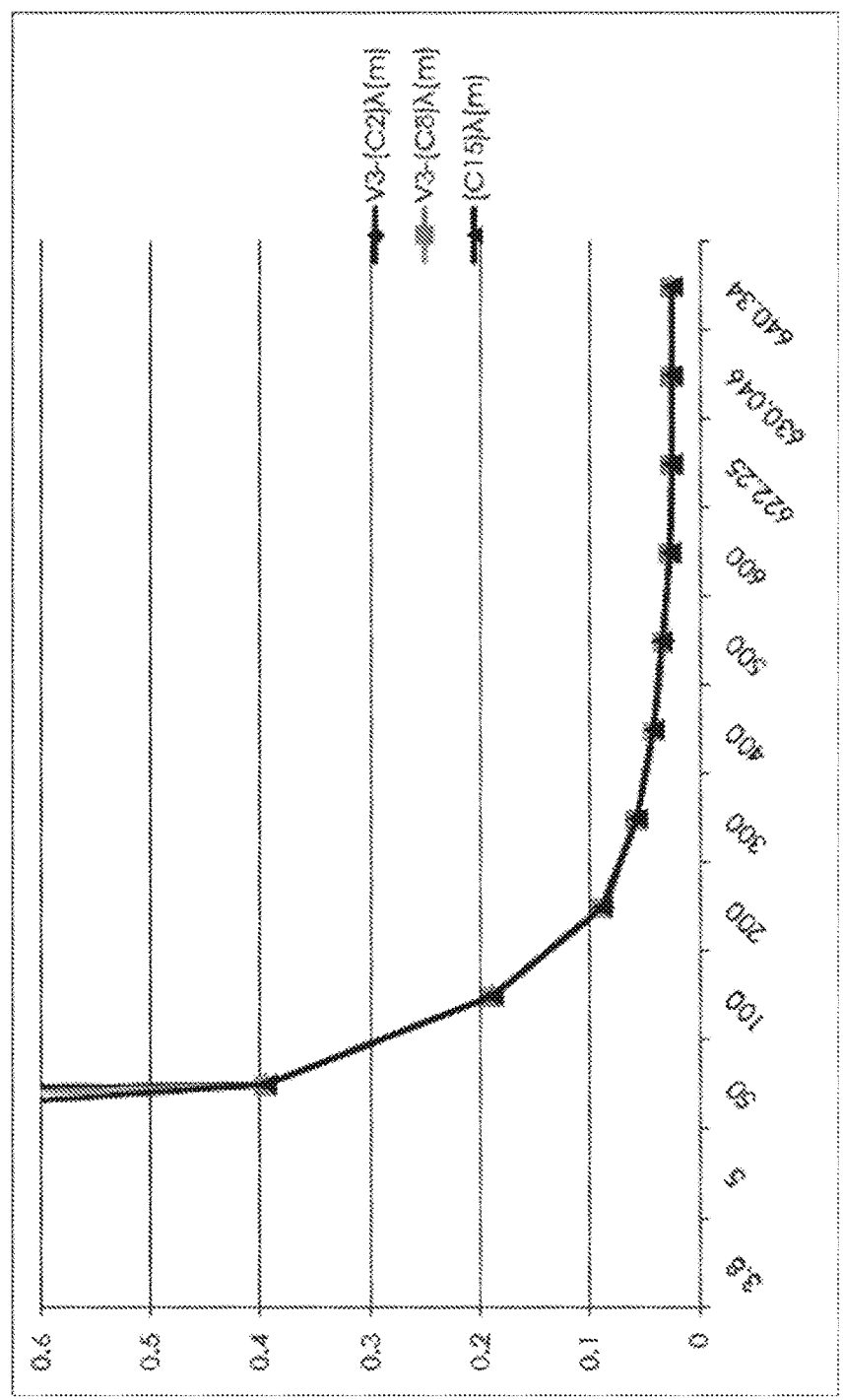
FIG. 7 shows a detail of the graph as FIG. 6, showing beam wavelengths between 0 and 0.6 m.

It can be noted that the tracked beam wavelength calculated by normal moveouts, clocked in terms of time (ns), then converted to frequency and wavelength, started at C2 at a depth of 3.8 m as 10.702 m, however at the same depth the wavelength was compressed to 3.442 m at C8 (50 m chainage), measured in the X-Chainage direction as 26.5 m by reflection on the WARR image. Then at C15 or 100 m field chainage the beam was compressed to 1.779 m at a reflection point at 50 m on the WARR image. At this depth range the sensors are still operating in the near field zone or Fresnel Zone FIG. 6 is a graph of beam wavelength (BA) at C2, C8 and C15 focusing locations obtained plotting data as tabulated in Tables 1(a), 1(b) and 1(c) plotted from 0-12 m on the y-axis, and FIG. 7 shows the same graph over 0-0.6 m on the y-axis. The graph shows variable slopes between transmitter TX and receiver RX separations from 1.0 m to 5.0 m at the beginning of the WARR scan. This would indicate a "Near Range" for the sensors in the unstable focusing Fresnel Zone.

The graph also show a marked "Transition Zone" from 5 m to 50 m, as the beams' diameters at sensor separations C2, C8 and C15 all converge towards the conjugate focal point at 50 m range. The graph also shows "Far Field" confocal focusing in the Fraunhofer zone to infinity, where all three sensor separations converge in vector beam widths from this conjugate focal point at 50 m to maximum range distance tracked at 640 m. FIG. 7 shows the "Far Field" focusing in the Fraunhofer zone to infinity, where all three sensor separations converge in vector beam widths from this conjugate focal point at 50 m to maximum range distance tracked at 640 m. The Confocal Wavelength curve from 50 m to 640 m in depth reveals a very high 6th Order Polynomial Trend with a Regression Coefficient of 0.98% for this (particular exemplary) dielectric WARR Scan looking vertically upwards the roof of this Test Mine in North America to the river and cutting the time range at 10 m in air above the river surface. This shows that the confocal focusing is very uniform for transmission and reception through rock, water and air in the opposite direction to the gravitational field.

Referring back to Tables 1 (a), 1(b) and 1(c), it can be seen that each horizon has a different dielectric constant and goes through different material media, such as air, rock, sediments and water. As a consequence of this, the beam and wavelength is compressed by different orders of magnitude. The concepts disclose herein use a measure of beam resolution to determine in determining temperatures.

Wave Propagation Through Measured Radar Beam Cross Sections

The Beam Wavenumber (Bn) of the beam is:

$$Bn = k x \sqrt{|DC|}$$

where: $k = 2\pi/\lambda$ and $\sqrt{|DC|}$ is the square root of the modulus of the dielectric constant, which is a measure of the electrical permittivity of the medium through which the beam is being propagated by transmission through the Radar Cross Section (RCA).

Considering a two dimensional RCA where the x-direction is horizontal to the surface of the ground and the z-direction is vertical; it will be appreciated that the x-direction is also the horizontal scan direction for moving W-Scans (WARR scans with variable focusing modes as the transmitter-receiver separation distance increases during the scan) or moving P-scans.

$$Bn = \frac{2\pi x}{\lambda} \sqrt{|DC|} = 2\pi x \sqrt{\left(\left(\frac{1}{\lambda_x}\right)^2 + \left(\frac{1}{\lambda_z}\right)^2\right)|DC|}$$

This formula clarifies the relationship between Bn, λ and DC.

The energy density (ρ) of ADR radiation through a layered RCA medium should increase with the absolute temperature in accordance with Stefan Boltzmann's Law:

$$\rho = \sigma T^4$$

The ADR Spectral Energy Density Ed(S) is the product of the energy density and the wavelength:

$$Ed(S) = \rho \lambda$$

This is a measure of the energy density contained within a wavelength range of distance (i.e., it is the Energy Density within a wavelength). The wave is a progressive wave and it travels along according to the progressive wave direction (PWD). Hence for the two dimensional RCA now being considered, the vector PWD can be resolved in terms of two components: λx, the horizontal component and λz, the vertical component.

Considering, as an example, the RCA medium of steam, where steam consists of OH molecules of water. This is a moving medium which diffuses through the rock layers according to thermodynamic principles of diffusion and cooling. In order to compute the vector and static relationships involved, boundary conditions should be established at a comprehensive range of temperatures so that the ADR relationships can be used to predict temperature values for the steam vector displacements.

Consider the horizontal component a of vector PWD of the ADR beam, this is a function of spectral energy density, more specifically:

$$\alpha = \frac{\rho \lambda_x}{Ed(S)}$$

then:

$$\frac{Ed(S)\alpha}{\lambda_x} = \rho$$

Therefore:

$$\alpha = \frac{\sigma \lambda_x T^4}{Ed(S)}$$

And, rearranging, it can be seen that the temperature T can be calculated by:

$$T = \sqrt[4]{\frac{Ed(S)\alpha}{\sigma \lambda_x}}$$

where α the horizontal component of vector PWD of the ADR beam.

Horizontal component $\lambda_x$ is computed in the x-scanning, horizontal direction computed according to the separation distances (i.e. the horizontal azimuthal distances between the stationary (Rx) receiver and the moving (Tx) transmitter during a WARR scan. There are 15 computation points called Crosses (from C1 (Rx stationary position) to C15 (the last x co-ordinate along the WARR Scan line). Hence there are 14 vector Move-out computations for components λx.

The spectral Energy Density Ed(S) is computed and measured from the Scan Data from each quantised image layer from the surface to the Range Time value set. In the WARR scan examples above, the quantised layers were 1 m thick from the ground surface (Time Zero position) to 10 m in depth from the surface. Thereafter each quantised layer was sub-sampled every 2.5 m to the maximum range position (looking vertically upwards from the mine to a final position 10 m above the river surface).

Methodology for Measuring Temperature

The Predicted Temperature Models developed for normal investigation of cold and hot oil reservoirs may be summarised in Table 2. The same temperature models may be applied to extremely cold ground layers such as permafrost zones, in this case the modelling can optionally stop at PT3 which seems to give the best results when compared with Borehole Thermistor Records.

TABLE 2

| Predictive Temp Model | Description of depth layer measures |
| --- | --- |
| PT1 | Prediction of Temperature (T) based on Stefan Boltzmann Law (Power/Radar Beam Volume) |
| PT1A | Scales PT1 through measured beam widths at top and bottom of each layer (WARR Tracking) |
| PT2 | Scales PT1A further from measured Energy Density and Frequency (%) per Wavelength transmission per layer |
| PT3 | Scales PT2 using Bandwidth over Maximum Beam Width timed since Minimum spread across WARR Section, minus Thermal Noise from the Progressive Wave Ratio (PWR) by [PWR/Fmean] where PWR = (Ed %/E %) |
| PT4 | Scales PT3 by the increasing ADR Beam Volume from MIN to MAX Time Spread across WARR Section |
| PT5 | Scales PT4 to allow for changing dielectric reflections using the ADR f-gamma parameter |
| PT5A | Scales PT5 further by measuring power (mW) and scaling this over the delta time factor sampled |
| PT6 | Scales pT2 using the measured E-ADR parameter to isolate thermal noise |
| PT7 | Scales PT6 using the inter-relationship between Energy (E %), Energy Density (Ed %), and Total Frequency (Tf %) from Layer Spectral Audit |
| PT8 | Scales PT7 by the power relationship with the mean energy (Em %) over the Wavelength compression factor ($\lambda_C$) |
| PT8A | Scales PT8 by the relationship between the Energy Density (Ed %) to λ and Total Frequency (Tf %) |
| PT8B | Scales PT8 further by averaging PT8 and PT8A per depth layer |

The first step is a first predictive temperature PT1 Computation. This may be described as the Basic prediction of Temperature from Stefan Boltzmann's Law, considering the ratio of Power and Transmitted Beam Volume through each Geological Layer divided in equal quantised thicknesses, as described above. An alternative form of the law is in terms of the excitance M: the power emitted by a region of surface divided by the area of the surface. The excitance is a measure of the brightness or radiance of the electromagnetic emission. Because the excitance through a layer of rock is proportional to the energy density through the layer, M is also proportional to $T^4$ and therefore:

$$M = \sigma T^4$$

where σ is the Stefan Boltzmann Constant.

As such, the first predictive temperature PT1 (in degrees centigrade) may be calculated by:

$$PT1 = ((5P)/(A * 5.67051 * 10^{-8}))^{0.25} - 273.15)/1024$$

where P is power (mW) and A is the beam cross section area ($m^2$) at right angles vertically to the Z axis (paraxial ray).

More specifically a loss function for P(mW) may be calculated per layer as follows:

$$P(mW) = V(v)^2 \cdot DC \cdot 1000, \text{ and}$$

$$V(v) = \text{ABS}((20 \cdot 10^\wedge{-3}) - (20 \cdot 10^\wedge{-3}) \cdot \text{Depth}(m) \cdot 0.02 \cdot (DC/80))$$

where DC is the layer Dielectric Constant. The variation of PT1 temperature calculation with depth for exemplary experimental data for thermal prediction from a WARR and STARE Scan over an area of thick permafrost, shows that the predicted temperature PT1 only rises slightly above 0° C. from 33.5 m in depth to 402.6 m in depth. The Borehole temperature from thermistor readings maintains a very level gradient around 0° C.

The method may further comprise performing a number of scaling computations on the resultant temperature PT1. The first of these, to obtain second temperature estimate PT1A comprises:

$$PT1A = (((PT1)/16) \cdot (\Phi)(1-\max)C2))/(\Delta\lambda x)C2).$$

Note that this formulation provides a better scaled relationship than PT1, based on the metrics $\Phi$ and $\Delta\lambda x$ for position C2 on the WARR Line, where $\Phi$ is the beam diameter in y-plane (at position C2 near the start of the WARR Scan) and $\Delta\lambda x$ is the computed wavelength at C2 in the X-scanning direction from the NMO computations.

Referring to the same exemplary experimental data discussed above, variation of the PT1A temperature with depth shows a more variable predicted thermal gradient down to 140 m, after which it levels off very much in line with the borehole gradient. However, the graph shows three sharp thermal anomalies. Since this algorithm depends on the measured beam width and compressed wavelength, the anomalies could represent locations where the beam has polarised giving a false rise in temperature. The polarisation in this case could be related to a sudden change in mean dielectric constant of the permanently frozen ground layer (e.g. through the presence of near surface boulder beds)

The PT1 temperature may be further scaled to obtain a third temperature estimate PT2, by defining the mean resonant predicted temperature. This PT2 is a function of PT1 and the ratio of energy density ρ and signal frequency f %. It is a more realistic prediction than PT1 because it considers the ratio of energy density within a wavelength to the frequency percentage and in this case, removes biases caused by sudden polarisation changes due to variable dielectrics.

PT3 is a third thermal computation of predicted temperatures, which in this case is not expressed as a function of pT1 or pT2. It is concisely expressed as a function of the Total Frequency percentage, the Bandwidth and the wavelength compression. The predictive formula is:

$$PT3 = ((Tf\%/Bw) \cdot \lambda_H)$$

where Tf % is the total frequency percentage from FFT Analysis of the layer thickness (in TWT-Two Way Travel time), Bw is the Bandwidth of the signal analysed and $\lambda_H$ is the compressed wavelength in the depth range direction.

The PT3 predictive temperature variation with depth in the exemplary experimental data more closely follows the thermistor records at around 0° C. It is interesting that this algorithm, which is completely different from the PT2 algorithm should faintly describe the same 10 short peaks described in the equivalent PT2 data.

A fourth thermal computation of predicted temperatures PT4 is simply the Layer Average Predicted Temperature of the PT2 and PT3 predicted values.

A fifth thermal computation of predicted temperatures PT5 comprises scaling and multiplying the predicted PT4 values by the F-Gamma values for each layer. One advantage of this is to magnify polarisation changes at dielectric boundaries; e.g. in permafrost layers, in hot oily sand layers with dielectric boundaries or in hot steamy sand layers with sharp dielectric boundaries, so that these geothermal layers can be mapped with depth.

A sixth thermal computation of predicted temperatures PT6 is a scaling parameter for PT2:

$$PT6 = ((1-V) \cdot PT2) + 32$$

Where: $V = ((1-0.5) \cdot (L - \text{MINL})/((\text{MAXL}) - (\text{MINL}))) + 0.5$, and $L = (E - ADR^2)$.

A seventh thermal computation of predicted temperatures PT7 scales PT6 using the inter-relationship between the following variables derived from the Spectral Layer Audit by FFT Analysis:

$$PT7 = ((((100-E\%) \cdot 8) - (ED\%/100) + Tf\% + 20)/1024)$$

where E % is Energy; ED % is the Energy Density and Tf % is the Total Frequency.

An eighth thermal computation of predicted temperatures PT8 scales PT7 by the power relationship with the mean energy (Em %) over the Wavelength compression factor ($\lambda_C$), thereby providing a more precise aspect ratio because of the more accurately computed wavelength compression $\lambda c$, as follows:

$$PT8 = (((P \cdot (Em\%/10) - 1.6) + (\lambda_C/32)) \cdot 1.6) + 4$$

where P is power (mW) and $P = (\text{ABS}((20 \cdot 10^\wedge{-3}) - (20 \cdot 10^\wedge{-3}) \cdot \text{Depth} \cdot 0.02 \cdot (DC/80))^2 \cdot DC \cdot 1000$ where and where: Depth=Depth(m) and D=DC (Dielectric Constant).

Note that Wavelength compression factor $\lambda_C$ is different to Wavelength compression factor $\lambda_H$. Wavelength compression factor $\lambda_H$ only measures wavelength compression in the depth range direction (horizon depth direction) while wavelength compression factor $\lambda_C$ considers wavelength compression in the scanning X-direction also. In this way, wavelength compression factor $\lambda_C$ is a two dimensional vector giving a more precise aspect ratio for the resulting predicted temperature graph.

An additional thermal computation PT8A Scales PT8 by the relationship between the Energy Density (Ed %) to A and Total Frequency (Tf %) as follows:

$$PT8A = (PT8 \cdot \rho/(Tf\% \cdot \Phi(1-20)C2)); (\Phi \text{ at WARR Position C2})$$

Finally, thermal computation PT8B is simply the average of PT8 and PT8A for each layer.

Any of these temperature estimates can be used as an estimate of the temperature for a particular layer or subsurface region.

The invention claimed is:

1. A method of obtaining a profile image of a surveyed subsurface region,
   obtaining depth information of the profile image, and determining a first temperature estimate of the surveyed subsurface region comprising steps of:
   using a transmitter to transmit a pulsed non-optical electromagnetic signal into the ground;
   using a receiver to detect a return signal following interaction of the transmitted signal with features of the surveyed subsurface region;
   performing a profile scan to obtain the profile image of the surveyed subsurface region by repeating the steps of transmitting the pulsed non-optical electromagnetic signal and detecting a return signal over a plurality of different points over the surveyed subsurface region;

performing a depth scan over the profile image of the surveyed subsurface region to obtain the depth information of the profile image;

calculating a dielectric constant of the surveyed subsurface region from a difference in velocity of the transmitted non-optical electromagnetic signal and the return signal;

measuring, from the received return signal, a power of the return signal;

measuring, from the received return signal, a cross-sectional area of the return signal;

determining the first temperature estimate from the calculated dielectric constant of the surveyed subsurface region, the measured power of the return signal, and the measured cross-sectional area of the return signal, and the depth information of the profile image; and storing the first temperature estimate in a log file.

2. The method as claimed in claim 1, comprising:
determining a beam diameter of the return signal;
determining a wavelength of the return signal;
taking a ratio of the determined beam diameter of the return signal and wavelength of the return signal: and
determining a second temperature estimate by multiplying the first temperature estimate by the determined ratio of the beam diameter of the return signal and a wavelength of the return signal.

3. The method as claimed in claim 2, comprising:
determining an energy density of the pulsed non-optical electromagnetic signal;
determining a return signal frequency of the pulsed non-optical electromagnetic signal,
determining a ratio of the energy density of the pulsed non-optical electromagnetic Signal and the return signal frequency of the pulsed non-optical electromagnetic signal:
and,
determining a third temperature estimate, the third temperature estimate being a function of the second temperature estimate and the determined ratio of the energy density of the pulsed non-optical electromagnetic signal and the return signal frequency of the pulsed non-optical electromagnetic signal.

4. The method as claimed in claim 3, further comprising:
determining a total frequency percentage of the return signal,
determining a bandwidth of the return signal:
determining a ratio of the total frequency percentage of the return signal and a bandwidth of the return signal;
determining a wavelength compression parameter of the return signal: and
determining a fourth temperature estimate from a product of the third temperature estimate, the determined ratio of the total frequency percentage of the return signal and the bandwidth of the return signal, and the determined wavelength compression parameter of the return signal.

5. The method as claimed in claim 1, wherein at least one of the profile scan and the depth scan identifies a number of different layers of the surveyed subsurface region divided by reflective boundaries, and the method comprises,
determining a temperature estimate for each individual layer of a plurality of the layers of the surveyed subsurface region from the corresponding received signal for each individual layer.

6. The method as claimed in claim 1, wherein the depth scan comprises a Wide Angle Reflection and Refraction scan comprising repeating the transmit and detect steps at a plurality of different points over the subsurface, with each repetition being performed with either one of the transmitter and receiver being moved, and the other of the transmitter and receiver remaining stationary, wherein the Wide Angle Reflection and Refraction scan is performed using the transmitter and receiver.

7. The method as claimed in claim 1, wherein the depth scan comprises a common midpoint scan comprising repeating the transmit and detect steps with the transmitter and receiver being moved apart from one another in equal distance steps, or at equal velocities, from a common point at each repetition.

8. The method as claimed in claim 6, comprising determining the depth information from the Wide Angle Reflection and Refraction scar using at least one of ray tracing of the pulsed non-optical electromagnetic signal and return signal and Normal Move-out techniques.

9. The method as claimed in claim 1, comprising monitoring an enhanced hydrocarbon recovery process with the determined first temperature estimate wherein a heated fluid is injected into the surveyed subsurface region to enhance recovery of hydrocarbons.

10. The method as claimed in claim 9, wherein the method comprises monitoring the flow of the heated fluid subsequent to injection.

11. A non-transitory computer readable medium storing therein sequences of computer-executable instructions for controlling an apparatus comprising at least one processor, a transmitter, and a receiver, the sequences of computer-executable instructions configured to cause the apparatus to perform the method of claim 1.

* * * * *